United States Patent
Fandrei, II

(10) Patent No.: US 9,695,697 B2
(45) Date of Patent: Jul. 4, 2017

(54) EROSION SHIELD, METHOD OF FABRICATING A SHIELD, AND METHOD OF FABRICATING AN ARTICLE HAVING A SHIELD

(71) Applicant: GENERAL ELECTRIC COMPANY, Schenectady, NY (US)

(72) Inventor: Theodore William Fandrei, II, Latham, NY (US)

(73) Assignee: General Electric Company, Schenectady, NY (US)

(*) Notice: Subject to any disclaimer, the term of this patent is extended or adjusted under 35 U.S.C. 154(b) by 914 days.

(21) Appl. No.: 14/036,733

(22) Filed: Sep. 25, 2013

(65) Prior Publication Data

US 2015/0086376 A1 Mar. 26, 2015

(51) Int. Cl.
*F01D 5/14* (2006.01)
*F01D 5/28* (2006.01)
*B23P 15/04* (2006.01)

(52) U.S. Cl.
CPC ............... *F01D 5/28* (2013.01); *B23P 15/04* (2013.01); *F01D 5/14* (2013.01); *F01D 5/286* (2013.01); *F01D 5/288* (2013.01); *F05D 2230/20* (2013.01); *F05D 2230/60* (2013.01); *F05D 2300/132* (2013.01); *F05D 2300/175* (2013.01); *F05D 2300/226* (2013.01); *Y10T 29/49229* (2015.01)

(58) Field of Classification Search
CPC .............................. F01D 5/28; B22F 2007/042
See application file for complete search history.

(56) References Cited

U.S. PATENT DOCUMENTS 4,152,816 A * 5/1979 Ewing .................... B22F 7/062
228/104
5,160,822 A 11/1992 Aleshin
(Continued)

FOREIGN PATENT DOCUMENTS

EP 1666633 A1 6/2006
EP 2047979 A1 4/2009

OTHER PUBLICATIONS

European Search Report and Opinion issued in connection with corresponding EP Application No. 14185114.7 on Apr. 7, 2015.

*Primary Examiner* — Gregory Anderson
*Assistant Examiner* — Jason Fountain
(74) *Attorney, Agent, or Firm* — McNees Wallace & Nurick LLC

(57) ABSTRACT

A method of fabricating a near-net shape erosion shield, a method of forming a shielded article, and a near-net shape erosion shield are provided. The method of fabricating a near-net shape erosion shield includes providing a base, positioning an energy source relative to the base, and depositing at least one wear resistant material over the base with an energy beam from the energy source. The at least one wear resistant material deposited on the base forms the near-net shape erosion shield configured to be positioned on a turbine component. The method of forming a shielded article includes removing the base from the near-net shape erosion shield, and securing the near-net shape erosion shield to a turbine component. The near-net shape erosion shield includes a near-net shape erosion-resistant portion configured to be positioned on a turbine component.

18 Claims, 4 Drawing Sheets

(56) References Cited

U.S. PATENT DOCUMENTS

| | | | | |
|---|---|---|---|---|
| 5,900,170 | A | * | 5/1999 | Marcin, Jr. ............ B23K 26/34 148/525 |
| 6,296,723 | B1 | * | 10/2001 | Tsantrizos ............... C23C 4/185 148/522 |
| 7,789,630 | B2 | * | 9/2010 | Schilling ............... B64C 11/205 416/224 |
| 2010/0200189 | A1 | * | 8/2010 | Qi .......................... B22F 3/105 164/492 |
| 2011/0097213 | A1 | * | 4/2011 | Peretti .................... B23P 15/04 416/241 A |
| 2014/0093365 | A1 | * | 4/2014 | Fandrei, II .......... B23K 1/0018 415/196 |

* cited by examiner

EROSION SHIELD, METHOD OF FABRICATING A SHIELD, AND METHOD OF FABRICATING AN ARTICLE HAVING A SHIELD

FIELD OF THE INVENTION

The present invention is directed to erosion shields, methods of fabricating shields, and methods of fabricating articles having shields. More specifically, the present invention is directed to laser aided manufacturing of shields and articles having shields.

BACKGROUND OF THE INVENTION

Components in power generation systems, such as the turbine rotor blades and the turbine stator blades, are used in turbine equipment and are often exposed to erosive environments. The erosive environment may result in component erosion caused by, for example, water droplets in steam turbines and/or by fine dust from oxide scale. In particular, water droplets can cause erosion of rear-stage turbine blades, where such water droplets are mixed with the steam for turbine driving. Erosion of turbine blades is problematic because it results in blade thinning and fatigue breakdown of the blade brought about by erosion.

One method of reducing erosion of the turbine blade from water droplets includes low heat-input build-up welding to build-up a plurality of single layers on the turbine component. Known build-up welding techniques take a significant amount of time to produce the desired erosion protection portion. Another problem with using such build-up techniques is that the erosion portion must also be machined after formation to the desired blade geometry, increasing processing steps and time in manufacturing, thereby increasing costs.

Another preventative measure is to use an erosion shield, for example, including a cobalt chromium alloy formulated for wear resistance (e.g. STELLITE®). The erosion shield is secured to the turbine component and protects the component from erosion. Materials for such erosion shields are provided in wrought condition, requiring processing and/or machining to achieve desired sizes and/or geometries. Such processing and/or machining is especially expensive for complex shapes, such as turbine blades or airfoils.

A process or producing or fabricating a shield, a process of fabricating an article having the shield, and an erosion shield that do not suffer from one or more of the above drawbacks would be desirable in the art.

BRIEF DESCRIPTION OF THE INVENTION

In an exemplary embodiment, a method of fabricating a near-net shape erosion shield includes providing a base, positioning an energy source relative to the base, and depositing at least one wear resistant material over the base with an energy beam from the energy source. The at least one wear resistant material deposited over the base forms the near-net shape erosion shield configured to be positioned on a turbine component.

In another exemplary embodiment, a method of forming a shielded article includes providing a base, positioning an energy source relative to the base, depositing at least one wear resistant material over the base with an energy beam from the energy source to form a near-net shape erosion shield, removing the base, and securing the near-net shape erosion shield to a turbine component.

In another exemplary embodiment, a near-net shape erosion shield includes a near-net shape erosion-resistant portion. The near-net shape erosion shield being configured to be positioned on a turbine component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a method of fabricating a near-net shape erosion shield, a method of forming a shielded article, and a near-net shape erosion shield. Embodiments of the present disclosure, in comparison to processes and articles not using one or more of the features disclosed herein, increase efficiency, decrease cost, increase ease of manufacturing, increase flexibility of manufacturing, decrease set-up time, permit blending of alloys in a single process, or a combination thereof.

Figure 1:
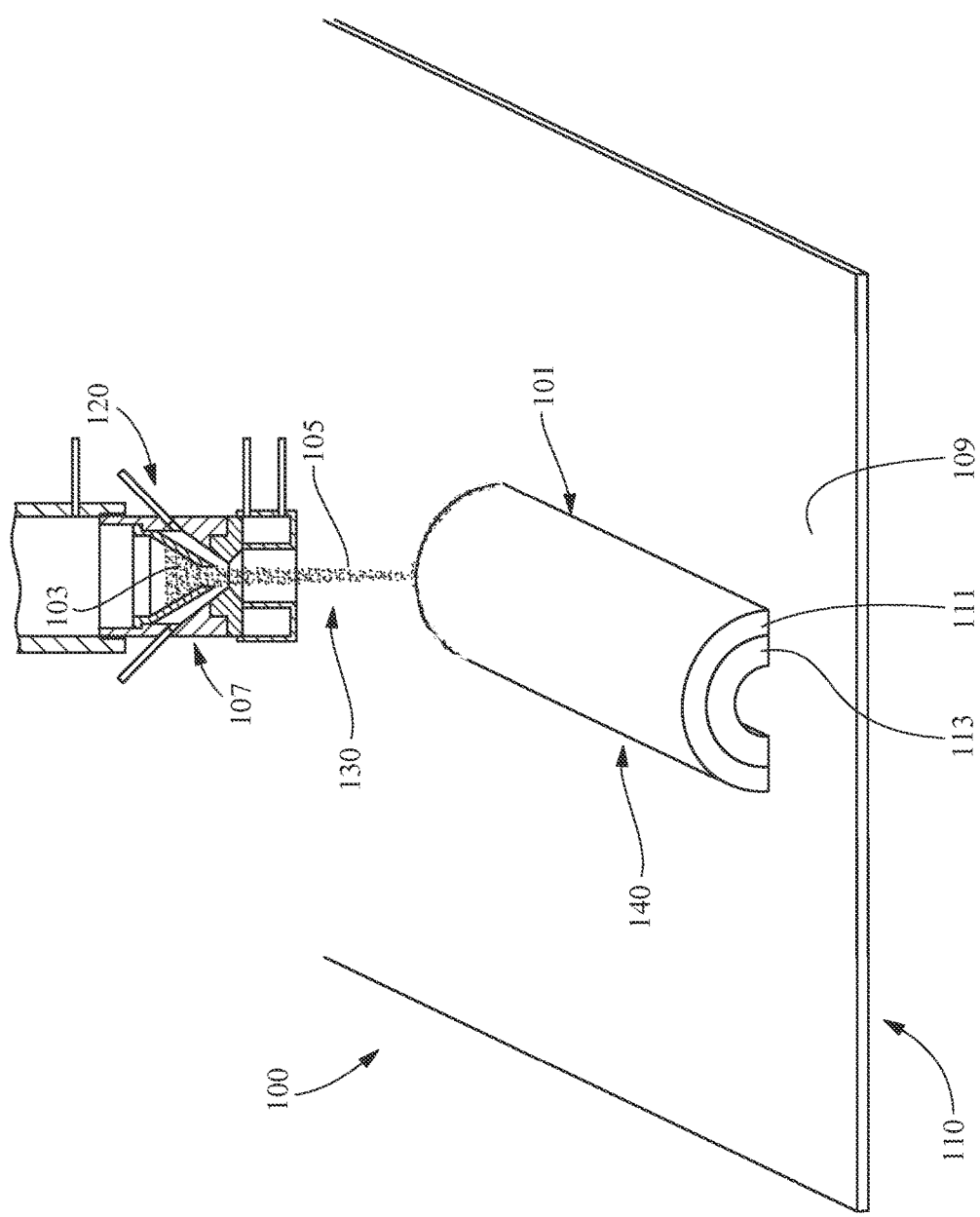
FIG. 1 is a perspective schematic view of a method of fabrication to produce a near-net shape erosion shield, according to the disclosure.
Figure 2:
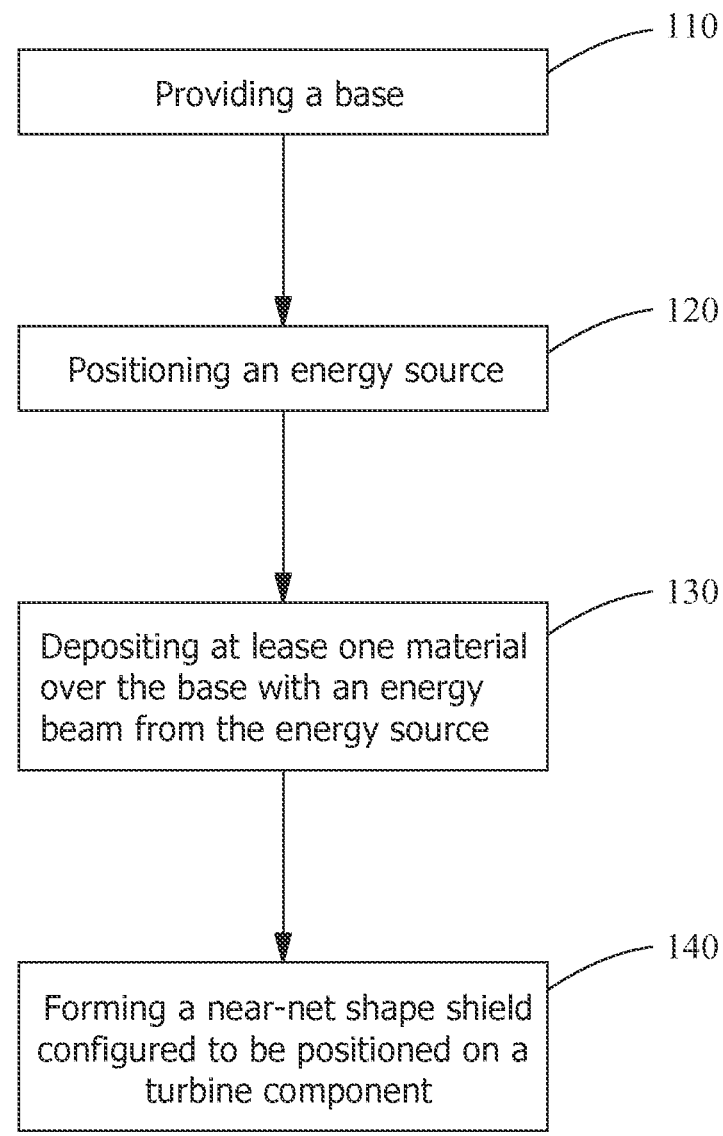
FIG. 2 is a process view of a method of forming a shielded article, according to the disclosure.

FIG. 1 represents an embodiment of a fabrication process 100 for fabricating a near-net shape erosion shield 101. The fabrication process 100 includes providing a base 109 (step 110), positioning an energy source 107 (step 120) relative to the base 109, and depositing at least one material 103 (step 130) over the base 109 with an energy beam 105 from the energy source 107. Depositing (step 130) of the at least one material 103 forms a shield 101 having a net or near-net shape configured to be positioned on a turbine component 201 (FIG. 2). As used herein, the phrase "near-net" refers to being of a geometry and size requiring little or no machining and processing. As used herein, the phrase "net" refers to being of a geometry and size requiring no machining and processing.

In another embodiment, the fabrication process 100 includes removing the shield 101 from the base 109. The base is any suitable base including, but not limited to, a sacrificial base, a composition similar to the turbine component 201, or a combination thereof. Further embodiments include heat treating the shield 101, and/or finishing of the shield 101, for example, by machining, sanding, grit-blasting, cutting, treating, coating, or a combination thereof. Alternate embodiments are devoid of finishing and/or machining, sanding, grit-blasting, cutting, treating, coating, or a combination thereof.

In one embodiment, the material 103 is deposited (step 130) using computer rasterization and/or laser aided manufacturing (LAM) performed in a non-oxidizing environment such as, but not limited to, a vacuum chamber, a shielding gas, or a combination thereof. The LAM is performed by any suitable energy beam 105 from the energy source 107.

Suitable energy beams include, but are not limited to, a laser beam, an electron beam, a plasma beam, an electric arc, or a combination thereof. The LAM includes layer by layer deposition (step 130) of the material 103, permitting formation of the shield 101 having net or near-net shape over the base 109 having a planar or substantially-planar configuration.

Additionally, the LAM permits any suitable variation of the material 103 during the layer by layer deposition (step 130) to create layers of differing composition within the shield 101. Suitable variations of the material 103 include, but are not limited to, compositional variations among layers, compositional variations within layers, or a combination thereof. For example, in one embodiment, the material 103 is varied to form the shield 101 having a shim portion 113 integral with an erosion-resistant portion 111, the shim portion 113 and erosion-resistant portion 111 having different compositions and different material properties. In another embodiment, the material 103 is varied to form the shield 101 having differing sections within the shim portion 113 and/or the erosion-resistant portion 111.

Figure 3:
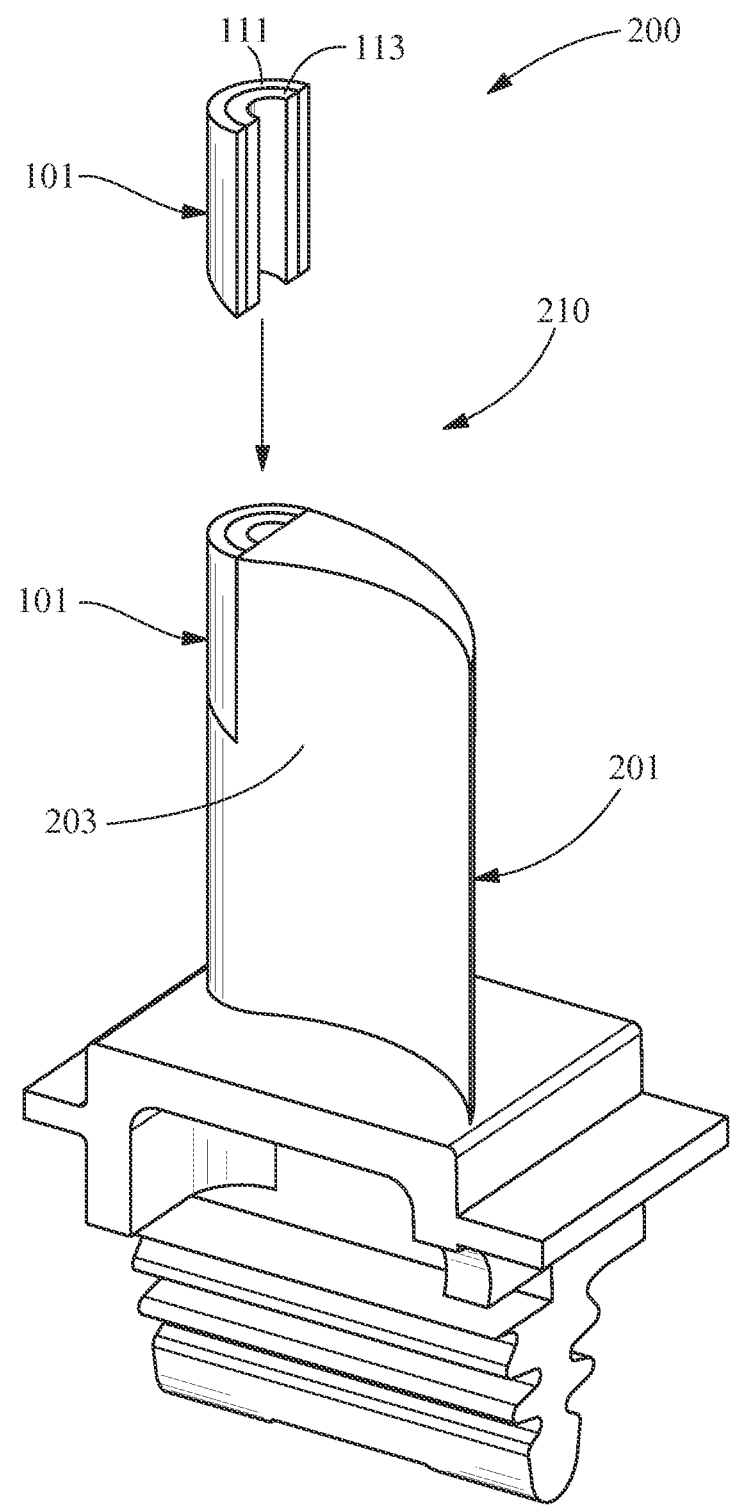
FIG. 3 is a perspective schematic view of a method of forming a shielded article, according to the disclosure.

Referring to FIGS. 2-3, in one embodiment, a method of forming a shielded article 200 includes securing (step 210) the shield 101 to the substrate 203 of any suitable turbine component 201 capable of being protected by the shield 101. Suitable turbine components capable of being protected by the shield 101 include, but are not limited to, one or more of a blade or airfoil, a nozzle, a valve, a diaphragm, a bucket, or a rotor. In another embodiment, the shield 101 is secured (step 210) to a pressure side of a leading edge portion of the bucket. In yet another embodiment, an existing shield is removed from the turbine component 201 and replaced by a new shield formed by the fabrication process 100.

The shield 101 is secured (step 210) by any suitable technique including, but not limited to, brazing, laser welding, electron beam welding, plasma welding, tungsten inert gas welding, metal inert gas (MIG) welding, or a combination thereof. In one embodiment, the shield 101 includes the erosion-resistant portion 111 and is secured (step 210) directly to the substrate 203. In another embodiment, the shim portion 113 facilitates the securing (step 210) of the shield 101 to the substrate 203. The shim portion 113 may be integral with the erosion-resistant portion 111, or formed from a wrought shim material and mechanically fit to the erosion-resistant portion 111. Additionally, the shim portion 113 that is formed from a wrought shim material may be positioned between the erosion-resistant portion 111 and the substrate 203 or attached to the erosion-resistant portion 111 prior to securing (step 210) of the shield 101.

The shim portion 113 includes any suitable composition capable of securing (step 210) the shield 101 to the substrate 203 of the turbine component 201 and survivable in the turbine environment. In one embodiment, the substrate 203 is composed of material selected from the group including, but not limited to, an iron-based or nickel-based alloy, a 12-chrome material, 410 stainless steel (UNS S41000), 403 stainless steel (UNS S40300), GTD-450™ (a precipitation-hardened steel having a nominal composition of 15.5% Cr, 6.3% Ni, 1.5% Cu, 0.37% Nb, 0.05% C, and the balance essentially Fe), or a combination thereof. The listing of materials is exemplary only, and is not intended to limit the scope of the disclosure as the shield 101 may be secured to any substrate 203. One suitable alloy has a composition, by weight, of about 0.15% carbon, about 1.00% manganese, about 0.50% silicon, between about 11.5% and about 13.0% chromium, about 0.04% phosphorus, about 0.03% sulfur, and a balance of iron. Another suitable alloy has a composition, by weight, of about 0.14% carbon, about 0.80% manganese, about 0.015% phosphorous, about 0.010% sulfur, about 0.2% silicon, about 11.5% chromium, about 2.5% nickel, about 1.6% molybdenum about 0.3% vanadium, about 0.03% nitrogen and a balance of iron. Another suitable alloy has a composition, by weight, of about 0.050% carbon, between about 14.0% and about 16.0% chromium, between about 1.25% and about 1.75% copper, about 1.0% manganese, between about 0.50% and about 1.0% molybdenum, between about 5.0% and about 7.0% nickel, about 0.30% phosphorus, about 1.0% silicon, about 0.030% sulfur, and a balance of iron. Suitable compositions of the shim portion 113 include, but are not limited to, Inconel, nickel-based alloy such as Inconel, alloy 600, or a combination thereof.

The shim portion 113 is any suitable thickness capable of conferring desired properties. In one embodiment, the thickness of the shim portion 113 is selected to provide a sufficient transition between a substrate 203 of the turbine component 201 and the erosion-resistant portion 111, thereby reducing or eliminating delamination, fatigue, welding difficulties, crack propagation, and/or other undesirable effects. For example, in one embodiment, the shim portion 113 provides a physical barrier limiting carbon migration between the substrate 203 and higher carbon material in the erosion-resistant portion 111, thereby reducing or eliminating weakening of a weld or heat affected zone. Suitable thicknesses of the shim portion 113 include, but are not limited to, between about 10 mils and about 200 mils, between about 50 mils and about 200 mils, between about 100 mils and about 200 mils, between about 150 mils and about 200 mils, between about 50 mils and about 150 mils, between about 100 mils and about 150 mils, between about 10 mils and about 100 mils, between about 50 mils and about 100 mils, between about 10 mils and about 50 mils, between about 10 mils and about 20 mils, or any suitable combination, sub-combination, range, or sub-range thereof, wherein 1 mil is equal to 0.001 inches.

The erosion-resistant portion 111 includes any suitable composition for reducing or eliminating erosion of the turbine component 201. Suitable compositions of the erosion-resistant portion 111 include, but are not limited to, cobalt-based alloys, chromium-based alloys, tungsten-based alloy, chromium carbide materials, or combinations thereof. In one embodiment, the composition of the erosion-resistant portion 111 is a member of the STELLITE® family of alloys. For example, in one embodiment, the erosion-resistant portion 111 has a nominal composition, in weight percent, of between about 27 percent and about 32 percent chromium, between about 4 percent and about 6 percent tungsten, between about 0.9 percent and about 1.4 percent carbon, and a balance of cobalt and incidental impurities. In another example, the erosion-resistant portion 111 has a nominal composition, in weight percent, of between about 1.4 percent and about 1.85 percent carbon, about 29.5 percent chromium, about 1.5 percent silicon, about 8.5 percent tungsten, and a balance of cobalt and incidental impurities.

The erosion-resistant portion 111 is any suitable thickness conferring desired properties of erosion resistance, wear resistance, and survivability in a steam or gas turbine environment. In one embodiment, the thickness of the erosion-resistant portion 111 is selected to confer a sufficient wear resistance and/or erosion-resistance, for example, over a predetermined life of a specific component/use. Suitable thicknesses of the erosion-resistant portion 111 include, but are not limited to, between about 200 mils and about 500 mils, between about 300 mils and about 500 mils, between about 400 mils and about 500 mils, between about 200 mils and about 400 mils, between about 300 mils and about 400 mils, between about 200 mils and about 300 mils, or any suitable combination, sub-combination, range, or sub-range thereof.

Together, the shim portion 113 and/or the erosion-resistant portion 111 form the shield 101 having any suitable thickness and/or width for protecting the turbine component 201. Suitable thicknesses and/or widths include, but are not limited to, between about 500 mils and about 750 mils, up to about 750 mils, up to about 500 mils, or any combination, sub-combination, range, or sub-range thereof.

The shield 101 is any suitable length capable of protecting the substrate 203 of the turbine component 201 from erosion. A suitable length includes, but is not limited to, a full length of the bucket, about ⅔ the length of the bucket, or about ⅓ the length of the bucket, wherein the bucket length is between about 4 inches and about 70 inches, between about 6 inches and about 20 inches, or any combination, sub-combination, range, or sub-range thereof.

Additionally, the shield 101 includes any suitable geometric features capable of being formed by use of the energy beam 105. Suitable geometric features include, but are not limited to, cavities, non-parallel surfaces, round/curved surfaces, angled surfaces, protrusions, gaps, or other difficult to form shapes/geometries. In one embodiment, the geometric features of the shield 101 substantially correspond or completely correspond with all or a portion of the turbine component 201 to be protected by the shield 101.

Figure 4:
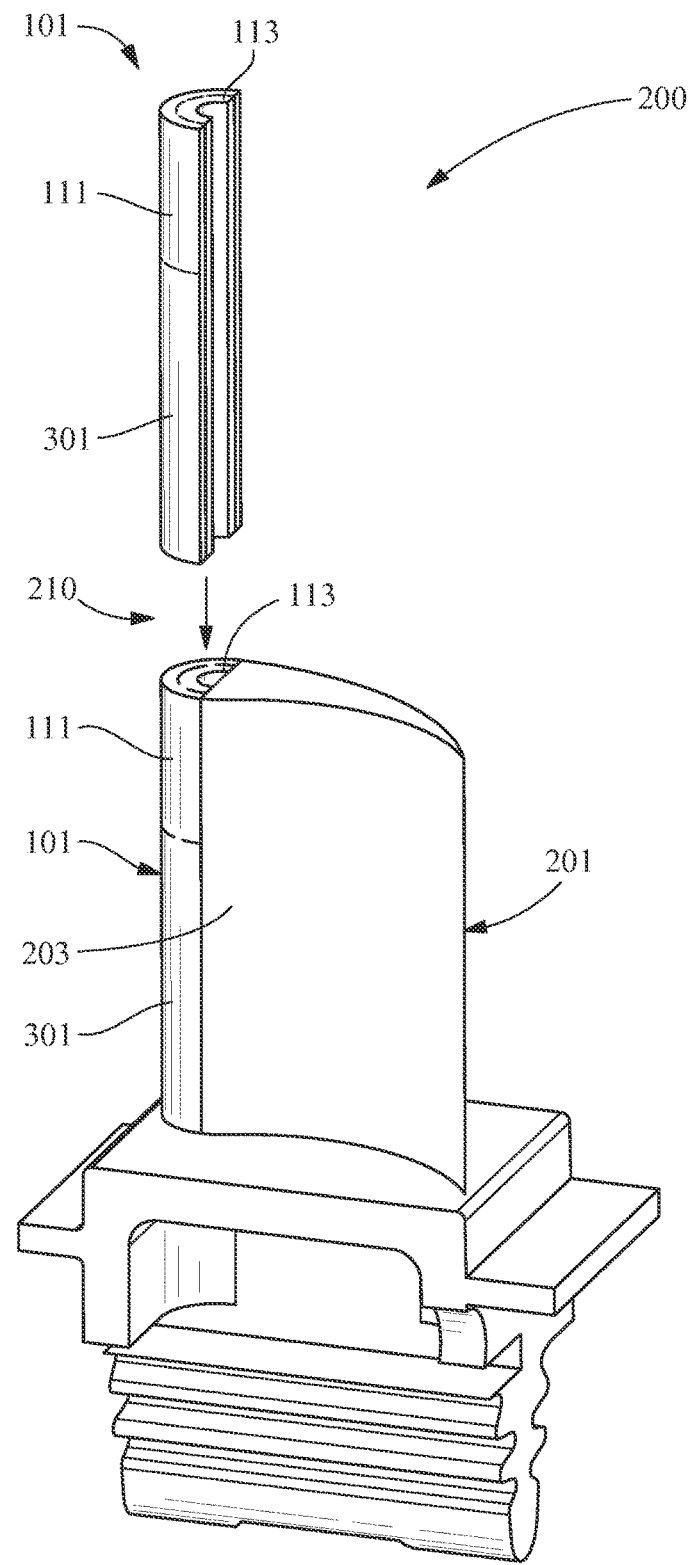
FIG. 4 is a perspective schematic view of a method of forming a shielded article, according to the disclosure.

Referring to FIG. 4, in one embodiment, the shield 101 includes a non-erosion-resistant portion 301 and an erosion resistant portion 111. The non-erosion-resistant portion 301 and erosion resistant portion 111 forming a continuous surface covering the turbine component 203 or alternatively the shim 113 overlying the turbine component 203. Referring to FIG. 4, in another embodiment, the erosion-resistant portion 111 covers about ⅓ of the shim 113 overlying the leading edge portion of the bucket and the non-erosion-resistant portion 301 covers the remaining ⅔ of the shim 113 overlying the leading edge portion of the bucket. For example, in the steam turbine the erosion-resistant portion 111 is positioned to cover and protect a distal ⅓ of the leading edge portion of the bucket where water droplets may increase corrosion of the bucket. In an alternate embodiment, the erosion-resistant portion 111 covers about ⅔ of the shim 113 overlying the leading edge portion of the bucket and the non-erosion-resistant portion 301 covers the remaining ⅓ of the shim 113 overlying the leading edge portion of the bucket. For example, in the gas turbine the erosion-resistant portion 111 is positioned to cover and protect a proximal ⅔ of the leading edge portion of the bucket where water from water washing may increase corrosion of the bucket.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of fabricating a near-net shape erosion shield, comprising:
   providing a planar base;
   positioning an energy source relative to the base;
   forming a shim over the base;
   depositing at least one wear resistant material over the base with an energy beam from the energy source; and
   removing the near-net shape erosion shield and the shim from the base;
   wherein the at least one wear resistant material deposited over the shim forms the near-net shape erosion shield configured to be positioned on a turbine component.

2. The method of claim 1, wherein the forming the shim includes depositing the shim over the base with the energy beam prior to depositing the at least one wear resistant material to form the near-net shape erosion shield having the shim integral with the at least one wear resistant material.

3. The method of claim 1, wherein the base is a sacrificial layer.

4. The method of claim 1, comprising selecting the energy beam from the group consisting of a laser, an electron beam, a plasma beam, and an electric arc.

5. The method of claim 1, further comprising depositing multiple layers of the at least one wear resistant material over the base.

6. A method of forming a shielded article, comprising:
   providing a planar base;
   positioning an energy source relative to the base;
   forming a shim over the base;
   depositing at least one wear resistant material over the shim with an energy beam from the energy source to form a near-net shape erosion shield;
   removing the base from the erosion shield and shim; and
   securing the near-net shape erosion shield to a turbine component.

7. The method of claim 6, wherein the forming the shim includes depositing the shim over the base prior to depositing the at least one wear resistant material over the base.

8. The method of claim 7, further comprising positioning the shim between the near-net shape erosion shield and the turbine component prior to securing the near-net shape erosion shield to the turbine component.

9. The method of claim 8, wherein the shim comprises a nickel-based alloy material.

10. The method of claim 6, further comprising securing the near-net shape erosion shield to the turbine component with a method selected from the group consisting of brazing and electron beam welding.

11. A near-net shape erosion shield, comprising:
   a shim comprising an alloy and having a planar attachment surface;
   a near-net shape erosion-resistant portion;
   wherein the shim is secured to the near-net shape erosion-resistant portion, and configured to be positioned between the near-net shape erosion-resistant portion and a turbine component.

12. The shield of claim 11, wherein a composition of the near-net shape erosion-resistant portion comprises an erosion-resistant alloy.

13. The shield of claim 12, wherein the erosion-resistant alloy is selected from the group consisting of cobalt-based alloys, chromium-based alloys, tungsten-based alloy, and chromium carbide materials.

14. The shield of claim 11, wherein the turbine component is a turbine bucket.

15. The shield of claim 14, wherein the shield is configured to be positioned on a leading edge of the turbine bucket.

16. The shield of claim 15, wherein the shield covers at least about ⅓ of the leading edge of the turbine bucket.

17. The shield of claim 11, comprising a non-erosion-resistant portion forming a continuous surface with the erosion-resistant portion.

18. The shield of claim 17, wherein the non-erosion-resistant portion covers about ⅔ of a leading edge of the turbine component.

* * * * *